UNITED STATES PATENT OFFICE.

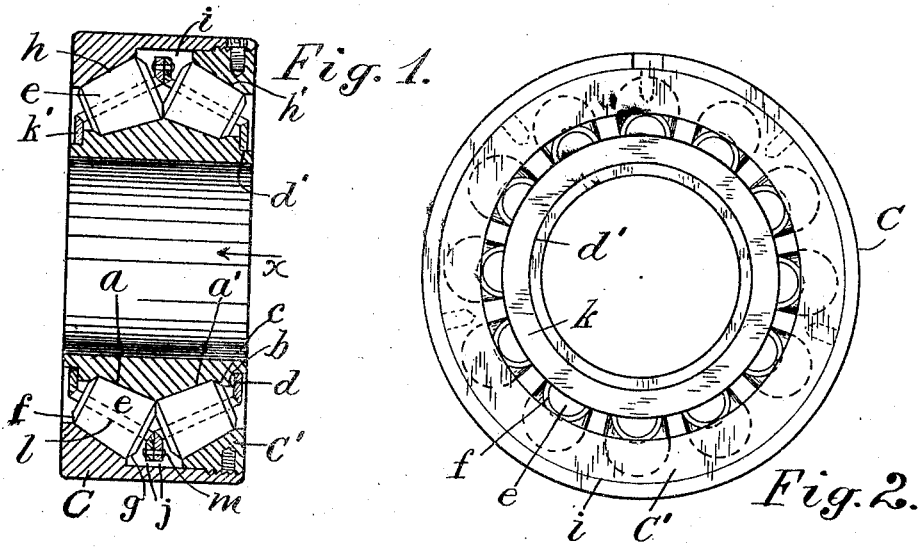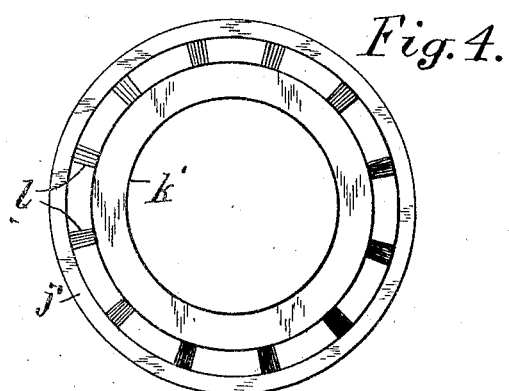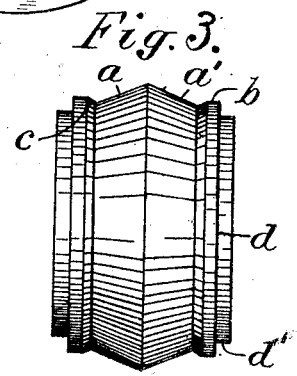

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING.

1,003,055.        Specification of Letters Patent.        Patented Sept. 12, 1911.

Application filed September 22, 1909. Serial No. 518,928.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearings, fully described and represented in the following specification and the accompanying drawings, forming a part of the same.

This invention relates to a roller bearing having two sets of conical rolls fitted to opposite ends of a doubly conical hub, and the object of the invention is to furnish means for preventing with the smallest amount of friction any end movement of the rolls upon their seats.

The construction is particularly adapted to a high-duty bearing of very compact character, which requires the rolls to be short and thus renders undesirable any projections at their ends which extend above their bearing surfaces. Plain conical rolls are therefore used, which are made flat at the end or with a beveled corner, either of which constructions can be made with equal cheapness.

The provision to prevent end movement of the rolls upon their conical seats consists of annular shoulders upon the smaller ends of the conical seats with which the smaller ends of the roll contact, and beveled corners at the inner ends of the rolls which contact with one another, so that if the rolls be held coincident in their rotation around the hub all end movement of the rolls is prevented. Such coincidence is secured by mounting the rolls in a cage having openings opposite one another in pairs, to receive the rolls in pairs and hold them with their centers alined.

The invention will be understood by reference to the annexed drawing, in which—

Figure 1 is a central cross section of a bearing provided with the invention; Fig. 2 is an end view of the same; Fig. 3 is an elevation of the hub; and Fig. 4 is an end view of the cage.

The hub is shown with two conical seats $a$, $a'$, connected directly at their larger ends and provided at their smaller ends with collars $b$ having a flaring edge $c$ next the conical seats, and a shoulder $d$ upon the outer side, perpendicular to the axis of the hub. Two sets of rolls $e$ are fitted to the seats $a$, $a'$ and formed with beveled ends $f$ and $g$, the corners of the ends $f$ facing against the flaring collars $c$ and the corners of the ends $g$ contacting with one another upon the highest point of the cone. The tapering bodies of the rolls thus bear throughout their entire length upon the conical seats of the hub.

The casing is formed with two opposed tapering seats $h$ and $h'$ fitted to the outsides of the rolls throughout their entire length, and holding them upon the seats on the hub. To adjust the seats $h$, $h'$ in the proper relation to the rolls, the body C of the bearing is formed with a chamber $i$ extended to one end, and a collar bearing one of the tapering seats, is screwed into the same so that it can be moved in and out. Where the larger ends of the rolls revolve in direct contact with one another as in Fig. 1, such line of contact must be maintained upon the central line of the rolls, which is effected by a cage formed in two sections, each having two rings $j$ and $k$ joined by guide-bars $l$, and the larger rings secured together by rivets $m$ and rotating in the chamber $i$. These cage-sections have coincident openings adapted to hold the rolls in pairs with their centers alined, so that they may rotate in contact with one another at the central line of the hub. The two sets of rolls are thus made to revolve in unison with one another, and each resists the constant tendency of the other to work upwardly toward the center of the hub whether subjected to radial load or end thrust. Owing to this normal tendency of the rolls under radial load to press toward the highest point of the hub, it is obvious that there is no normal pressure of the outer ends of the rolls against the inwardly facing shoulders $c$, and there is therefore no wear or grinding upon such shoulders except the bearing be subjected to thrust. Any longitudinal thrust of the hub crowds one of the collars $c$ against the adjacent ends of the rolls, but the contact of such rolls with the opposite set of rolls transmits the thrust immediately to such opposite set where any movement is resisted by the opposite seat in the casing. It is therefore evident that the collars $c$ or $c'$ at the smaller ends of the hub perform a material service in transmitting any end thrust upon one end of the hub, which may be called the nearer end, to the rolls upon the opposite or farther end of the hub, which rolls have a natural tendency to slide upward on the conical hub under such thrust, but which are prevented from so doing by the end contact of the two sets of rolls with one another.

Having thus set forth the nature of the invention what is claimed herein is:

In a roller bearing, the combination, with a hub having two conical seats with bases adjacent and collars forming inwardly facing shoulders at their smaller ends, of two series of rolls having plain tapering bodies bearing throughout their entire length upon the conical seats of the hub with their extreme outer ends in contact with the said shoulders, and their inner ends beveled at the corners and contacting with one another to transmit end thrust, a casing having plain tapering seats fitted to the entire length of the conical rolls, and a cage having two sections with openings having their centers alined to hold the rolls in pairs, substantially as herein set forth.

In testimony whereof I have hereunto set my hand in the presence of two subscribing witnesses.

CHARLES S. LOCKWOOD.

Witnesses:
   L. LEE,
   THOMAS S. CRANE.